UNITED STATES PATENT OFFICE.

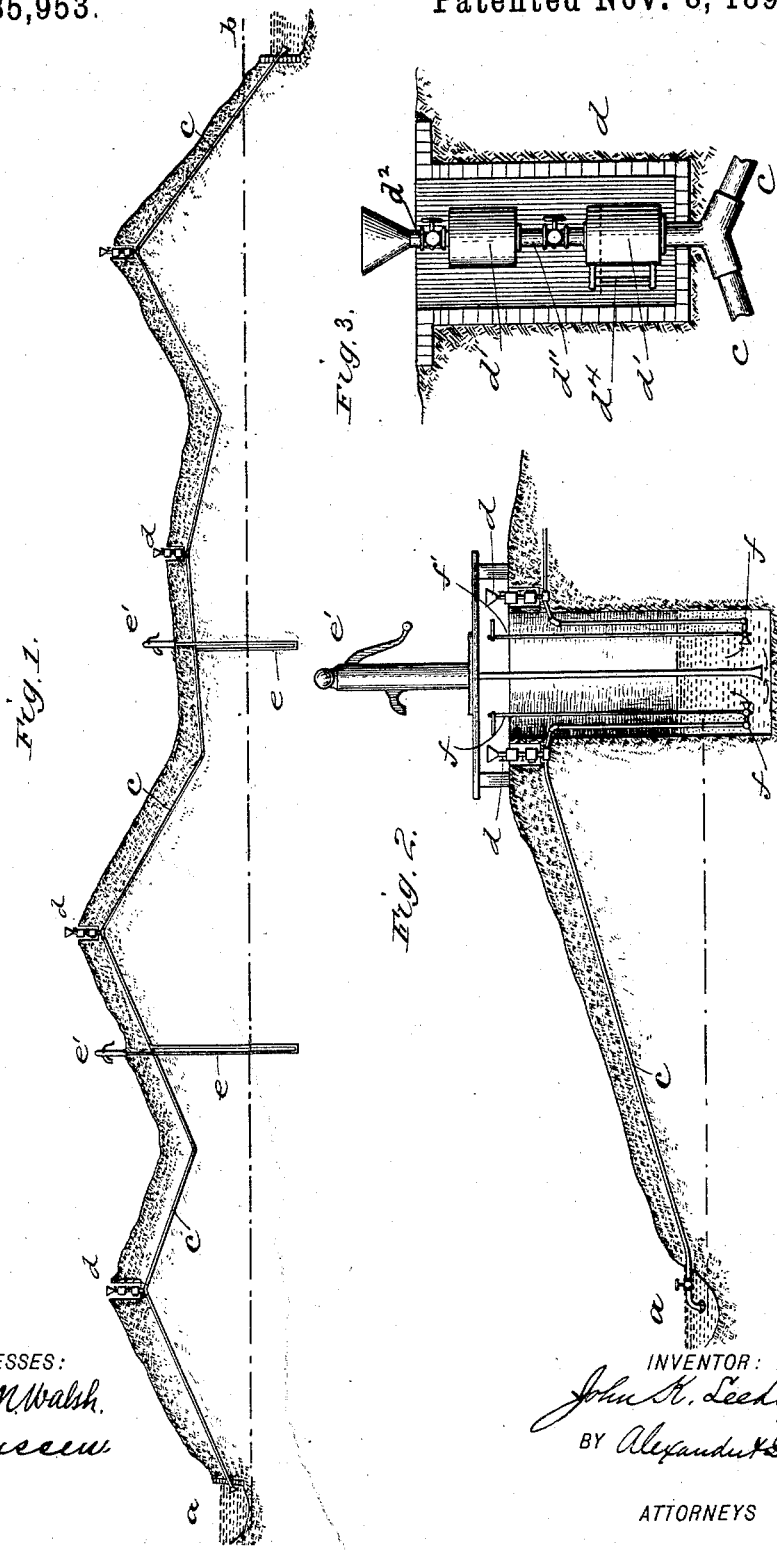

JOHN K. LEEDY, OF TOM'S BROOK, VIRGINIA.

SIPHONIC WATER-DISTRIBUTING APPARATUS.

SPECIFICATION forming part of Letters Patent No. 485,953, dated November 8, 1892.

Application filed January 26, 1892. Serial No. 419,331. (No model.)

*To all whom it may concern:*

Be it known that I, JOHN K. LEEDY, a citizen of the United States, residing at Tom's Brook, in the county of Shenandoah and State of Virginia, have invented certain new and useful Improvements in Siphonic Water-Distributing Apparatus, of which the following is a specification, reference being had therein to the accompanying drawings, in which—

Figure 1 represents a vertical section of a portion of the earth surface, taken on the line of the main pipe; Fig. 2, a similar view, enlarged, of a portion of the route of the main; and Fig. 3, a detail view of my improved air-trap.

This invention relates to certain improvements upon that class of siphonic water-distributing apparatus covered by my former patent, No. 413,194, granted October 22, 1889, wherein the distributing-main is arranged to siphon the water over any elevations and depressions that may intervene between the source of supply and the outlet, both ends of the distributing-main being sealed in water so as to prevent ingress of air, the siphonic arrangement serving to cause the water to flow continuously through the main, no matter what may be the depression of the same between the source and outlet points. The present improvements will be readily understood by reference to the accompanying drawings.

In the drawings, $a$ designates the source of supply, which may be a stream, reservoir, or spring, and $b$ the discharge or exit point or body, slightly below the former in order to obtain the siphonic action. The main $c$ connects these two bodies of water, and it follows the contour of the country over which the water is desired to be carried, whether the depressions and elevations be above or below the liquid level of the source and outlet. It is essential in ascending elevations that the main be without bends or loops, so that any air that may find its way into the main will rise readily to the apex of each elevation. The air that may rise to the highest points in the bends in the main is taken off by the improved trap $d$. (Shown most clearly in Fig. 3.) This trap consists of two chambers $d'$, connected together by a valved pipe $d''$, the lower chamber being connected to the apex of the main by a short pipe and the upper one being provided with a short valved pipe $d^2$ and a filling-funnel. As the air rises in the main it flows in the lower chamber and displaces the water therein, the quantity of air in this chamber being ascertained readily by a glass or other gage $d^4$. When it is desired to let the air out of the chamber without destroying the siphon by letting additional air into the main, the upper chamber is first filled with water and the upper valve closed tightly. Then the lower valve $d''$ is opened and the water in the upper chamber permitted to run down into the lower chamber and the air in this latter chamber permitted to pass up into the upper chamber. Then the lower valve is closed again. In this way all the air collected in the higher portions of the main may be readily drawn off without permitting additional air to get into the main while doing so. This is a very important feature of this invention.

If it is desired to draw off water from any part of the main for use, it may be readily done by connecting a branch pipe $e$ with the main and extending it down into the earth below the water-level at the source, and then carrying it back to the surface of the earth, where a pump $e'$ may be attached to draw the water. It is necessary in making service-pipe connections to carry the water down below the level of the source before taking it from the main in order that air may not be sucked into the main through the pump, as will be observed.

If desired, the main may be arranged to discharge into wells arranged along the line of the main, as shown in Fig. 2, the well being in every case sunk below the level of the source or supply and the traps connected to the highest points of the mains, preferably below the platform of the well. In this case suitable valves $f$ will be placed in the submerged ends of the pipes, the valves being operated by rods $f'$, extended to the surface of the ground. These are of advantage in closing the ends of the siphon while filling the same through the trap at the top. A pump or other means may be employed to draw the water from the well.

Having thus fully described my invention, what I claim, and desire to secure by Letters Patent, is—

1. In a siphonic water system, the combination of a water-main having its respective ends sealed by immersion in a source of supply and discharge, the supply-source being above the level of the source of discharge-water, the intermediate portions of the main having angular bends whose apexes are above the level of the source-water, air-traps located at these apexes and constructed substantially as described, pipes *e*, connected to the main at intervals along its length, said pipes being carried below the level of the water-source and then to the surface of the ground, and pumps connected to the upper ends of these pipes, substantially as described.

2. A siphonic water system consisting of a water-source, a water-discharge below the source, a main connecting the source and discharge and having intermediate elevations and depressions, service-pipes connected to the main at intervals along its length, said pipes being carried below the level of the water-source and then to the surface of the ground, and pumps connected to these service-pipes, substantially as described.

In testimony whereof I affix my signature in presence of two witnesses.

JOHN K. LEEDY.

Witnesses:
   C. D. DAVIS,
   JOHN M. WALSH.